Aug. 7, 1928.

J. H. CROWELL

TOOTHPICK

Filed Feb. 19, 1925

1,679,651

WITNESSES:

INVENTOR

Patented Aug. 7, 1928.

1,679,651

UNITED STATES PATENT OFFICE.

JOHN H. CROWELL, OF TISBURY, MASSACHUSETTS.

TOOTHPICK.

Application filed February 19, 1925. Serial No. 10,427.

My invention relates to improvement in tooth picks in which the pick, composed of quill, or other elastic material, held by a holder, slides within a case, referring particularly to the improvement, in tooth picks patented February 1, 1881, Number 237,093, in which the pick though supposed to be securely held by the jaws of the holder (which are smooth where they come in contact with the pick) would at times by being wedged between the teeth be withdrawn from the holder, thereby leaving the pointed pick in the mouth, which would not only be disagreeable and possibly dangerous but would doubtless cause the owner of the tooth pick to be displeased with an article that would not function. Now the objects of my improvement are first to provide a holder that will hold a small pick positively securely; second to construct the jaws of the holder of two separate pieces thus facilitating and utilizing the full force of the movable screw sleeve on the jaws of the holder when gripped to hold the pick, which can not be done by jaws composed of one piece as shown in the patent of 1881, for the reason that when a thin pick is inserted between the jaws and the screw sleeve of the holder is screwed onto the jaws, only the outer ends of the jaws will grip the pick and even then the full force of the sleeve can not be utilized to hold the pick because a portion of its force must be used to overcome the spring of the jaws that is required to keep the jaws apart for the insertion of the pick.

Figure 1:
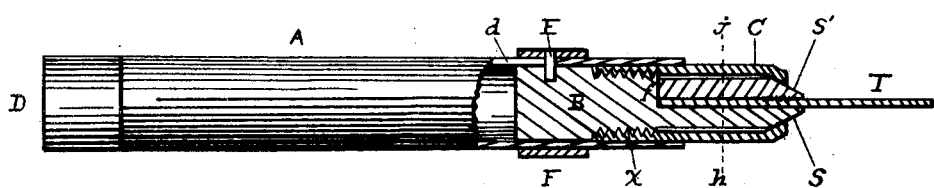
Figure 2:
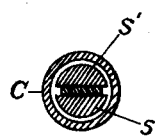

I attain the above mentioned objects by the mechanism and construction illustrated in the accompanying drawings in which Fig. 1 is an elevation of the entire tooth pick with a longitudinal section showing the holder and pick;

Fig. 2, a vertical section of the holder jaws and sleeve on the line $j$, $h$.

Similar letters refer to similar parts throughout the several views.

A, represents the tooth pick case, one end of which is covered with the cap D. The other end is left open for the purpose of allowing the holder B, with its pick T, to be thrust out and withdrawn for use and protection.

The holder B is slidable in both directions within the case as actuated by the ring F, and connecting-pin E, guided by the slot $d$, holder B, the jaw S is integral with the holder B, the jaw, S' is of a separate piece from the holder and loosely abuts against the shoulder F formed at the base of the member S and is movable laterally toward the member S, said jaws are made tapering at their outer ends so that they will coincide with and allow said jaw S' to be actuated by the incline or tapering end of the screw sleeve C which screws on to the holder at X. One of the jaws is provided with teeth on the side that comes in contact with the pick, preferably as shown on the jaw S' having its inner end bearing against the shoulder $f$, of the holder. These jaws S, S' one of which is stationary and the other being movable when gripped upon the inserted pick T, by the screwing on of the sleeve C, will receive the full actuated force of the sleeve, thereby imbedding the teeth into the pick and holding it secure. The case A being open at one end permits the reversal, when desired, of the holder B and the insertion of its free end within case for the protection of the tooth pick.

What I claim as my invention, and desire to secure by the Letters Patent, is—

1. In a tooth pick, the combination, with a case, of a longitudinally movable pick holder located therein, and composed of one integral jaw, and one detached movable jaw, and threaded clamping sleeve for closing said jaws, whereby the pick is securely held, against accidental detachment and can be projected for use and housed for preservation, substantially as set forth.

2. A tooth pick holder comprising a hollow case, a holding member slidable longitudinally within said case and provided with a longitudinally directed integral extension, a shoulder formed at the junction of said extension with the holder body, a second jaw loosely seated against said shoulder and means for moving said second jaw inwardly toward the said extension to thereby firmly hold a tooth pick between said jaws, all as shown and described.

3. In a tooth pick holder having a holding member slidable longitudinally within a hollow case and having an integral longitudinal extension adapted to serve as one holding member, and provided with a shoulder at its junction with the body member, and a second member loosely seated on said shoulder and adapted to serve as conjunction with said integral extension to firmly hold an interposed tooth pick all in combination with each other and adapted to serve as specified.

JOHN H. CROWELL.